July 6, 1965

E. M. FISCHEL 3,193,216

INERTIAL GUIDANCE SYSTEM WITH TWO OPPOSITELY
SPINNING PENDULOUS GYROVERTICALS

Filed May 12, 1952

INVENTOR.
Eduard M. Fischel
BY
G. J. Kessenich and A. W. Dew
Attorneys.

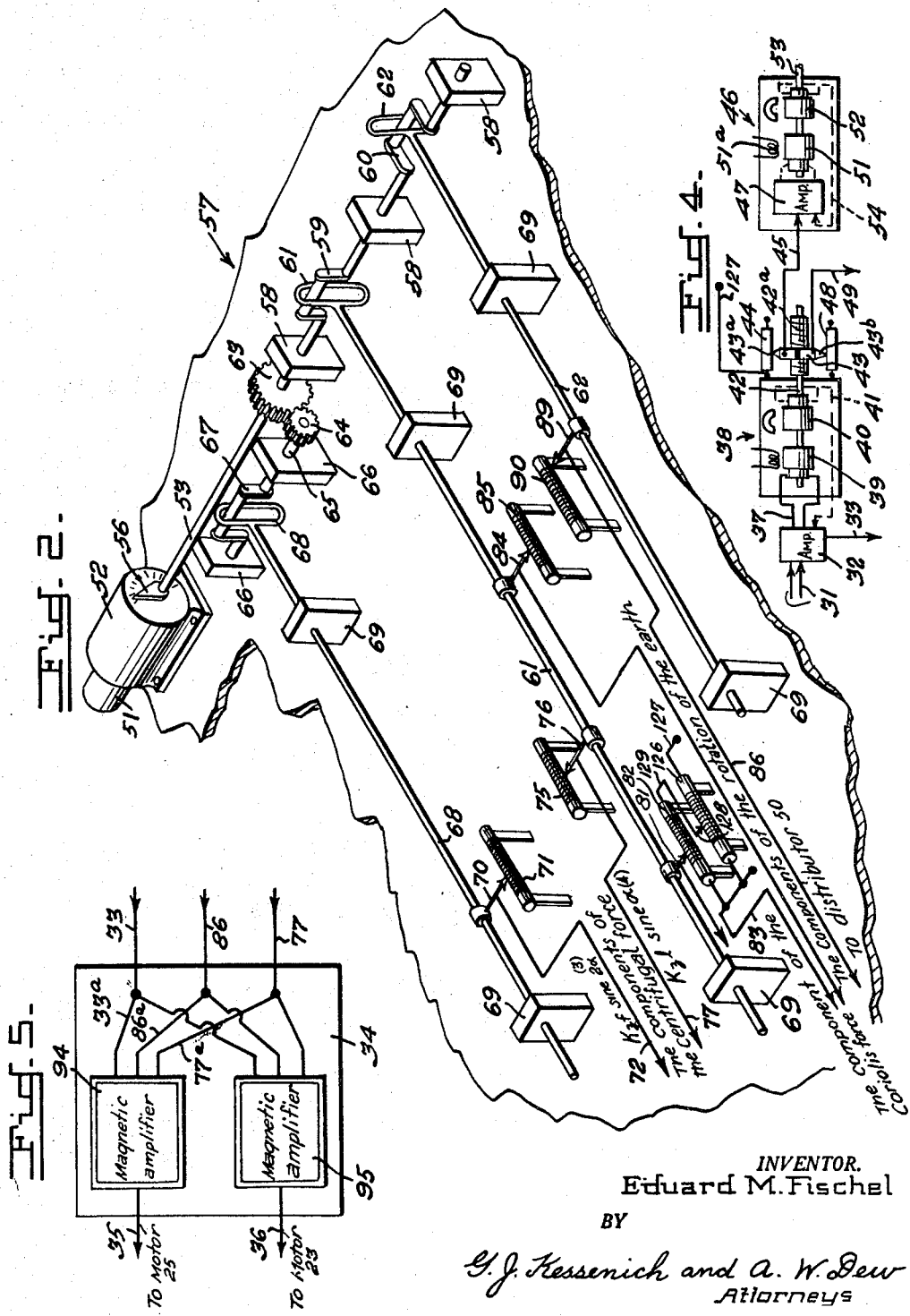

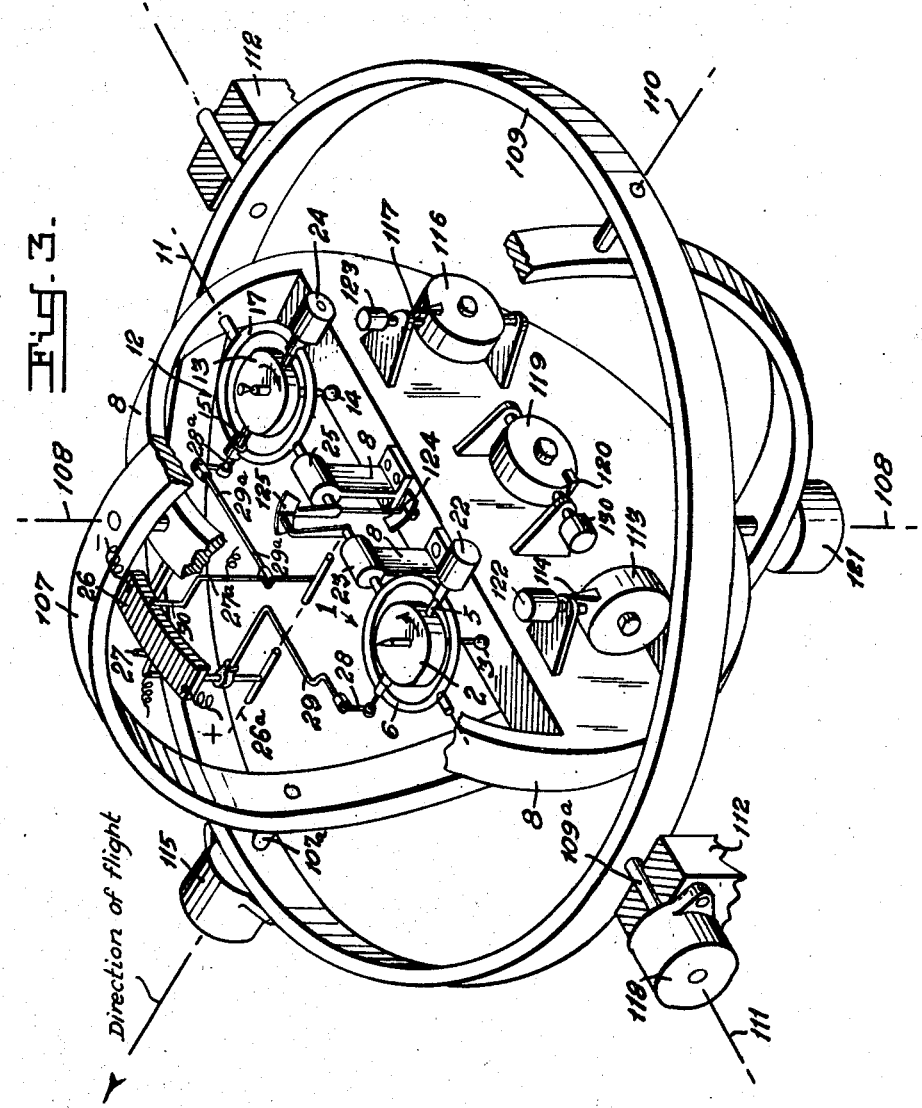

United States Patent Office 3,193,216
Patented July 6, 1965

3,193,216
INERTIAL GUIDANCE SYSTEM WITH TWO OPPOSITELY SPINNING PENDULOUS GYROVERTICALS
Eduard M. Fischel, Huntsville, Ala., assignor to the United States of America as represented by the Secretary of the Army
Filed May 12, 1952, Ser. No. 287,409
16 Claims. (Cl. 244—14)
(Granted under Title 35, U.S. Code (1952), sec. 266)

The invention described herein may be manufactured and used by or for the Government for governmental purposes without the payment of any royalty thereon.

This invention relates to automatic gyroscopic control mechanism for guided long-range missiles.

In prior mechanisms this control comprises essentially a device for effecting a double integration of the horizontal components of acceleration in two mutuallly-normal directions, together with direction-maintaining means for determining and stabilizing the aforesaid directions with respect to the cardinal directions. Basically such mechanisms consist of (1) a horizontally and directionally stabilized platform, (2) two accelerometers each responsive to acceleration of the platform in a respective one of two mutually-normal directions and means responsive to the output of such accelerometers for performing a double-integration of acceleration to give instantaneous velocity and distance, and (3) a computer for calculating the compensating forces necessary to counteract the disturbing influences otherwise introduced into the integrands by the rotation of the earth and the angular velocity of the missile about the earth's center.

It is the principal object of this invention to provide a construction wherein the measurement of acceleration and maintenance of a horizontal reference plane are combined in one device comprising two pendulous gyroscopes or gyroverticals, and their accessories, thereby rendering unnecessary separate and distinct accelerometers and providing an instrument which is smaller, lighter, simpler and more compact than prior art devices of a like nature, and without any sacrifice of accuracy.

Other objects are to provide a guidance or control mechanism for guided missiles wherein (1) acceleration is measured and determined as a function of the relative precession of a pair of gyroverticals about axes parallel with the flight path; (2) wherein the acceleration is taken off in the form of a voltage directly proportional thereto and re-applied to the gyroverticals in amplified form to induce precession opposite to but less than that induced by the acceleration itself whereby the precession angles, although small are substantially directly proportional to the accelerations; (3) wherein an amplified version of the voltage is twice integrated with respect to time to give true velocity and distance traveled along the flight path; (4) wherein the distance traveled is converted into the angle subtended by radii to the earth's center from (a) the instantaneous missile position and (b) the intersection of the equator with the plane of the great circle trajectory; (5) wherein the aforesaid angle is utilized to compute correction voltages proportional to corrections for (a) the earth's centrifugal force, (b) the component of the Coriolis force in the horizontal plane and (c) the earth's rotation; (6) wherein the aforesaid correction voltages are synthesized or combined in the proper relation to produce two resultant voltages which are utilized to cause precessions of the gyroverticals to maintain their spin axes at all times substantially directed toward the center of the earth.

Other objects and advantages will be apparent to those skilled in the art after a study of the following description in connection with the accompanying drawings.

In the drawings:

FIGURE 1 is a schematic view showing the two gyroverticals or pendulums and their interconnection with the several parts of the integrators.

FIGURE 2 is a schematic view showing the computer for the compensating forces.

FIGURE 3 shows the universal mounting for and arrangement of the gyroscopes.

FIGURE 4 is a schematic view showing the first and second integrators.

FIGURE 5 is a diagram of the distributor for combining the correctional voltages to be applied to the torque motors effective about the lateral axes of the gyroscopes.

FIGURE 6 is a diagram of the distributor for combining the correctional voltages to be applied to the torque motors effective about the longitudinal axes of the gyroscopes.

FIGURE 7 is a schematic view showing a magnetic amplifier.

Referring in detail to the drawing, and particularly to FIGURE 1, a first pendulous gyrovertical is identified generally at 1 and comprises a rotor casing 2 rendered pendulous by an attached mass such as 3. The casing is supported by trunnions 4 and 5 within a gimbal 6 for pivotal movement about a normally fore and aft axis 7 of the missile. Gimbal 6, in turn, is supported by trunnions 9 and 10 on the innermost member 8 of a universally mounted support, subsequently described, for pivotal movement about a normally transverse axis 11. A second gyrovertical generally identified at 12 is similar in construction with gyrovertical 1, so that it is sufficient to identify rotor casing 13, pendulous mass 14, trunnions 15 and 16 therefor mounting the casing for pivotal movement about an axis 7' parallel to axis 7' in gimbal 17. The latter has trunnions by which it is journaled in member or ring 8, for pivotal movement about axis 11. It will be understood that each casing has therein a rotor, not shown, journaled for spinning about normally vertical axes and driven by any suitable known electrical or pneumatic means, not shown. As indicated by the arrows 20 and 21, the rotor of gyro 1 spins counterclockwise looking down in FIGURE 1, while that of gyro 12 spins clockwise. The two gyroscopes are identical as regards ballistic characteristics and, as they are spun at the same speed, their rotors have equal momentums. Hence the gyroscopes precess equally and in opposite directions in response to any component acceleration in the fore-and-aft direction.

Gyro 1 is provided with two torque motors or torquers 22 and 23. Motor 22 is carried by gimbal 6 and its rotor is coupled to the trunnion 5 of casing 2. Hence, when energized, the motor applies a torque to the gyroscope about axis 7 and thereby induces precession about axis 11. Torque motor 23 is fixed to member 8 and has its rotor connected with trunnion 10 whereby, upon energization of the motor, a torque is applied to the gyroscope about axis 11 and, for the position of the parts shown, causes precession about axis 7 in one direction or the other, depending upon the direction of the applied torque.

Gyroscope 12 has a like pair of torque motors or torquers 24 and 25 which need not be described in detail in view of the fact that they are identical with motors 22 and 23, respectively, and similarly connected with gyroscope 12.

The equal and opposite precessions of the gyroverticals 1 and 12 about axes 7 and 7' are utilized to establish a potential proportional to the angle of precession. For this purpose an arcuate potentiometer winding 26 is fixed to support member 8 by a bracket, not shown. The winding is coaxial of an axis 26a midway between the two gyros and extending parallel to axes 7 and 7'. Slider arms 27 and 27a are independently mounted for pivotal movement about this axis and each extends upwardly into electrical contact with a respective side of the winding. Trunnion 4 has a radial arm 28 secured to its projecting end. The distal end of this arm is connected by a link 29 with slider 27. The link 29 has an effective length equal to the separation of axes 7 and 26a, and is connected with its ends at the same distances from those axes, so that slider 27 turns through the same angles as arm 28. The connection between slider 27a and trunnion 15, is the same as described for slider 27. Consequently it is sufficient to mention arm 28a secured radially of and to trunnion 15, and link 29a interconnecting the arm and slider. Potentiometer 26 is supplied from a source of D.C. (not shown). Sliders 27 and 27a are connected to amplifier 32 to apply a D.C. signal the polarity and value of which depends upon the direction of movement thereof. The voltage is proportional to the angles through which the gyroscopes precess about the axes 7, 7'. It will be understood that the angles of precession are maintained very small and, also, that arms 28 and 28a, together with all parts carried thereby, are suitably counterbalanced so that the weight thereof does not apply any torque to the gyroscopes about the respective axes 7 and 7'. Because of the small angles of precession involved, the effect on sliders 27 and 27a of precession of the gyroverticals about axis 11, is negligible.

Voltages established by equal and opposite movement of sliders 27 and 27a over winding 26 are applied over leads 31 to amplifier 32 which may be of conventional design. The amplified voltage is conveyed over lead 33 to a distributor 34, subsequently described in detail, and over leads 37 to a first integrator 38 where the amplified voltage is integrated with respect to time. As the amplification and integration are straight line, the output voltage from 38 is a measure of the linear velocity of the missile. This output voltage is conveyed over line 49 to a second distributor 50, also subsequently described in detail, and over line 45 to a second integrator 46. Both integrators may be of a type and construction fully disclosed in my copending application Serial Number 277,056, filed March 17, 1952, now Patent No. 2,946,539, for Long Range Ballistic Rockets. These integrators are shown at FIGURE 4 wherein 38 is seen to comprise a motor 39 direct connected to a D.C. generator 40 whose output is fed by connections 41 to amplifier 32 in opposition to the input over leads 31 from potentiometer 26. As explained in my copending application identified, the net or resultant voltage applied to amplifier 32, although small, is sufficient to enable the output of the high-gain amplifier to turn the motor. Since the relationship between the voltage from potentiometer 26 and the rotation of motor 39 is linear, the total rotation of the motor is proportional to the time integral of the net voltage effective upon the amplifier. The shaft 42 driven by the motor, has a threaded portion 42a which engages a potentiometer slider 43 having contacts 43a and 43b insulated one from the other. Contact 43a is moved over a linear winding 44 while contact 43b is similarly moved over a linear winding 48.

For reasons which will be subsequently explained, the output from the second integrator is desired in the form of a shaft rotation proportional to the instantaneous magnitude of the angle $\alpha$ subtended by two radii from the earth's center, one to the instantaneous position of the missile and the other to the point of intersection with the equator, of the plane containing the great circle trajectory. This may be visualized by assuming a plane passing through the great circle path of the missile which plane, of course, by definition, contains the earth's center. This plane intersects the adjacent portion of the equator at a point; and the angle $\alpha$ is that angle subtended by radii from the earth's center to that point and the instantaneous position. The angle $\alpha$ is therefore in general, not the same as instantaneous latitude and should not be confused therewith. Only when the trajectory is northerly in the northern hemisphere, or southerly in the southern hemisphere, along a meridian, will the angle $\alpha$ have the same numerical value as latitude.

This angle is clearly a function of the latitude of the launching site, the great circle course angle, the speed of the missile and time elapsed since launching. Since the latitude of the site and course angle are known, the constant portion of the angle between radii to the launching site and equator point is known for any given trajectory and may be pre-set. The value of the rate of change of the angle $\alpha$ will thus vary directly as the linear speed of the missile and, by dividing the time integral thereof by the radial distance, missile to earth's center, a value is obtained directly proportional to the angle itself. Applying a pre-set voltage to feed winding 44 expressed as a velocity constant the voltage established by movement of slider 43a over winding 44 is the value of the instantaneous velocity. The time integral of the voltage input applied over lead 45 to amplifier 47 would be proportional to the total angular distance measured from the launching site to the instantaneous position of the missile about earth's center and, denoted as $\Delta\alpha$. The angle between equator and launching site on the great circle of the trajectory will be $\alpha_0$. Therefore, one can say $\alpha=\alpha_0+\Delta\alpha$. The angle $\alpha_0$ is introduced by pointer 56 (FIG. 2) before launching.

The second integrator 46 is generally of the same construction as integrator 38, with its amplifier 47 incorporated therein, so that it is sufficient to identify motor 51, D.C. generator 52, their common shaft 53, and feedback connection 54.

The function of computer 57 is to generate and apply to the torque motors of the gyroverticals certain corrections made necessary by the rotation of the earth, the centrifugal force of the earth and the Coriolis acceleration due to motion of the missile over and relatively to the earth's surface. In the following equations the symbols used have this significance:

M—angular momentum of the gyro rotors.
$\omega_e$—angular velocity of the earth in rotation about its polar axis.
$\gamma$—angle between the great circle of the pre-selected trajectory from launching site to target and measured, in the northern hemisphere, clockwise from west.
$\alpha$—instantaneous angle of position of the missile as it passes along its trajectory.
$m$—pendulous mass of the gyroverticals.
R—radial distance from missile to earth's center.
$v$—linear velocity of the missile.

To compensate for the deviations otherwise caused by the earth's rotation a torque must be applied about the lateral axes of the gyroscopes having the value $$M\omega_e \sin \gamma \cos \alpha = K_{el} \cos \alpha \tag{1}$$

and about the longitudinal or flight axes having the value $$M\omega_e \cos \gamma = K_{ef} \tag{2}$$

since M, $\omega_e$ and $\gamma$ are all assumed to remain constant for any given flight.

To compensate for the errors otherwise introduced by the centrifugal force of the earth, a force must be generated and applied in the direction of flight, having the value $$m\frac{R\omega_e^2}{2} \sin^2 \gamma \sin 2\alpha = K_{sf} \sin 2\alpha \tag{3}$$

and in the lateral direction having the value $$m\frac{R\omega_e^2}{2} \sin 2\gamma \sin \alpha = K_{sl} \sin \alpha \tag{4}$$

since $m$, R, $\omega_e$ and $\gamma$ are all constants for any given flight.

To compensate for the error otherwise caused by the Coriolis acceleration, a force must be generated and applied in the lateral direction having the value $$2m\omega_e \sin \gamma v \sin \alpha = K_{cl} v \sin \alpha \tag{5}$$

The computer forming a component part of my invention generates voltages having the values of Equations (1), (3), (4) and (5) as above given. These voltages are properly combined in distributors to be described, and applied to the torque motors 22, 23, 24 and 25, in the sense necessary to counteract the deviations or errors which the respective natural forces would otherwise introduce.

Referring specifically to FIGURE 2, wherein numeral 57 identifies the computer generally, there are shown motor 51, generator 52 and output shaft 53 which, if desired, may have a pointer and scale 56 to give a direct reading of shaft position for initial setting and testing. Shaft 53 is journaled in bearings 58 and includes cranks 59 and 60 having equal throws and crank arms at 90° angular relation. Crank 59 controls the position of sine bar 61 while crank 60 controls the position of cosine slide bar 62. Shaft 53 also has fixed thereto a gear 63 which meshes with a gear 64 fixed to a shaft 65 journaled in bearings 66 and having a crank 67. The pitch circles of gears 63 and 64 have a 2:1 diameter ratio so that shaft 65 turns through twice the corresponding angle of shaft 53, namely $2\alpha$.

Crank 67 controls the position of a cosine slide bar 68. All three bars are guided for translation in parallelism by bearings 69 and the initial position, shown upon FIGURE 2, is such that bar 61 is translated by a distance proportional to $\sin \alpha$, bar 62 proportional to $\cos \alpha$, and bar 68 proportional to $\sin 2\alpha$ as shaft 53 is rotated through an angle proportional to $\alpha$, the instantaneous position angle as previously defined.

Bar 68 carries a slider 70 which moves therewith over and in contact with a potentiometer winding 71 whose terminals have applied thereto a voltage proportional, to the scale of the instrument, to $$m\frac{R\omega_c^2}{2} \sin^2 \gamma$$

that is, $K_{zt}$. As the slider 70 is adjusted proportional to $\sin 2\alpha$, the potential taken off by the slider is a measure of $K_{zt} \sin 2\alpha$ and is applied by lead 72 to distributor 50, there combined with other voltages in the manner subsequently described, and the resultant voltage applied over lines 73 and 74 to torque motors 22 and 24, respectively.

From Equation 4 supra, it is noted that the other error otherwise introduced by the centrifugal force of the earth is $$m\frac{R\omega_e^2}{2} \sin 2\gamma \sin \alpha$$

that is, $K_{zl} \sin \alpha$ for any given flight in which the course angle is assumed to remain constant. Therefore a constant voltage proportional to $K_{zl}$ is applied to winding 75; and since slider 76 is adjusted as a function of $\sin \alpha$, the necessary voltage proportional to $K_{zl} \sin \alpha$ is applied by line 77 to distributor 34 where, after combination with other voltages as subsequently described, the resultant voltage is applied by leads 35 and 36 to torque motors 25 and 23, respectively.

From Equation 5, it is noted that a Coriolis correction having the value $2m\omega_e \sin \gamma v \sin \alpha$, that is $K_{cl} v \sin \alpha$, is applied about the longitudinal axis. For this purpose a potentiometer 126 is fed with the voltage coming from the integrator over a line 127 (see also FIGURE 4), proportional to $2m\omega_e v$. A slider 128 is manually pre-set proportional to $\sin \gamma$ and the resulting voltage proportional to $2m\omega_e v \sin \gamma$ is fed to potentiometer 82 by lead 129. Furthermore, the voltage of line 49 representing the velocity of the missile, goes through the magnetic amplifier 50 and the lines 73 and 74 to the torquers 22 and 24, and causes both gyros to precess in the same direction that the missile turns. The angular velocity of this precession is proportional to the velocity of the missile divided by the distance of the missile from earth's center. Thus the spin axes of the gyros are maintained radially of earth's center.

Referring to Equation 1 supra, it is noted that the correction to be applied about the lateral axis to correct for the error otherwise introduced by earth rotation, is $$M\omega_e \sin \gamma \cos \alpha = K_{el} \cos \alpha$$

This correction is applied by a potentiometer winding 90 having a slider 89 secured to cosine bar 62. As the potential applied to winding 90 is proportional to the value $K_{el}$ to the scale of the instrument, the component voltage $K_{el} \cos \alpha$ is applied by line 86 to distributor 34 and thence, after combination with other signal voltages coming in over lines 33 and 77, to torque motors 23 and 25.

The voltage from potentiometer 85 having a value proportional to $M\omega_e \sin \gamma \sin \alpha$ is equivalent to the component of earth rotation about the course axis and has to be introduced to the torquer 130 of course gyro 119 in FIGURE 3. The component of earth rotation about the lateral axis of the amount $M\omega_e \cos \gamma$ should be picked up from another potentiometer, not shown, and sent over line 91 to torquers 22 and 24 to thereby produce a precession of the gyros about the lateral axis. Since the voltage $M\omega_e \cos \gamma$ is a constant for the flight, the slider of this potentiometer is pre-adjusted and is not connected with shaft 53.

The distributors 34 and 50 are shown schematically upon FIGURES 5 and 6, respectively. Thus, referring to FIGURE 5, there are shown leads 33, 86 and 77, all extending into distributor 34. Each lead has branches extending into the two magnetic amplifiers 94 and 95. As previously described, lead 35 extends from amplifier 94 to torque motor 25, while lead 36 extends from amplifier 95 to torque motor 23. Similarly, in the case of distributor 50, signals are fed thereinto from lines 49, 72, 83 and 91 and each has branches leading to magnetic amplifiers 96 and 97. See FIG. 6. For the purpose previously described, line 73 extends from amplifier 96 to torque motor 22 of gyro 1 and line 74 extends from amplifier 97 to torque motor 24 of gyro 12.

One of the magnetic amplifiers 94 is shown at FIGURE 7 to consist of a pair of cores 98 and 99 of a material of high permeability such as "Permalloy," "Hypernic" or "Mu metal" having primary windings 100, 101 and 102 about their contiguous sides. As shown, these windings are connected with leads 33a 86a and 77a respectively, from the computor as previously explained. As a result of this arrangement the constant unidirectional flux in cores 98 and 99 is in direct proportion to the algebraic sum of the D.C. currents flowing in the three windings.

An alternator 103 is included in an output circuit including rectifier 104 and secondary windings 105 and 106 in series and output leads 35 extend from the rectifier to the field coils 25a of torque motor 25. As the magnetic amplifiers are all of the same general type and construction and may be fed from a common source of A.C. 103, a description of the others is unnecessary.

The frequency of the alternator 103 is constant as is its voltage output. Assuming that no current is flowing in windings 100, 101 and 102, the reactance of secondary windings 105 and 106 is high so that little or no pulsating D.C. flows in field coils 25a. The flux induced in cores 98 and 99 by primary windings 100, 101 and 102 is proportional to the algebraic sum of the currents flowing therein. As this flux increases, the reactance of windings 105 and 106 decreases and the average value of the pulsating current output to motor 25 increases. The resulting energization of motor 25 causes a precession of gyroscope 12 about axis 7' which is equal and opposite to the components previously identified, otherwise introduced by centrifugal and Coriolis forces and rotation of the earth.

As shown, distributors 34 and 50 each have two magnetic amplifiers of the type just described. Those in distributor 50, of course, have four windings instead of three, namely, one each fed by leads 49, 72 83 and 91 as and for the purpose previously described.

The stabilized base for the gyroscopes is shown in detail upon FIGURE 3. Gimbal ring or support 8 has previously been described. This ring is journaled within a second ring 107 for pivotal movement about a normally vertical axis 108. Ring 107 is journaled within a third ring 109 for pivoted movement about the axis 110 extending in the direction of flight and, in turn supported by a part 112 fixed to the frame or body of the missile, for pivotal movement about an axis 111 laterally horizontal and normally parallel with axis 11.

Three stabilizing gyros are mounted upon support 8. Gyro 113 has a normally horizontal transverse spin axis and a vertical precession axis so that this instrument precesses in response to any component torque tending to pivot the base about axis 110. This gyroscope has a pick-off, generally identified at 114 and controlling by electrical connections, not shown, a torque motor 115 having its casing fixed to and carried by ring 109, and its rotor connected with shaft 107a of ring 107. The electrical connections between the pick-off 114 and motor 115 are well known and are effected such that the torque exerted by the motor upon ring 107 will annul the torque or force inducing precession of gyroscope 113, whereby the support 8 is stabilized about the axis 110. In a like manner, gyroscope 116 is supported on member 8 to have a normally horizontal fore-and-aft spin axis and vertical precession axis so that precession in one direction or the other is induced by any force tending to pivot ring 109 from the horizontal or level position about axis 111. Gyro 116 has a pick-off generally indicated at 117 which controls a torque motor 118 by connections, not shown. Motor 118 is so mounted that energization thereof applies a torque to ring 109 through its supporting shaft or bearing 109a. The connections are such that the applied torque is in the direction opposite to the disturbing torque or force. The connections are such that the force exerted by the motor 118 is substantially proportional to the angle which gyro 116 precesses from normal or centralized position. As, for the small angles of precession involved, the precession will be substantially in straightline proportion to the disturbing force, by proper proportioning of the voltages energizing motor 118, the correcting torque applied thereby will be substantially equal to, or slightly greater than, the disturbing torque. As a result, the disturbing torque and its effect are annulled so that the support 8 is stabilized in fixed horizontal position. The foregoing explanation is also applicable to gyro 113 previously described, so that support or ring 8 is stabilized about both horizontal axes.

Gyro 119 is shown mounted upon support 8 with its spin axis normally horizontal in the direction of flight and its precession axis horizontally transverse thereto. Hence this gyro precesses in response to any force or torque tending to deflect the support about the normally vertical axis 108 and its pick-off 120 is connected, by means not shown, with torque motor 121 whereby, upon energization thereof, a compensating or annulling torque is applied to support 8 about axis 108 and the support thereby course-stabilized.

Gyros 113 and 116 carry torque motors 122 and 123, respectively, energizable to apply torques about the precession axes of each. These torque motors may be controlled by pick-offs operated by gyrovertical 13. Thus, for example motor 123 may be energized by pick-off 124 consisting of a contact arm or slider moving over the usual spaced insulated sectors coaxial of axis 11 and operated in response to any long-period deviation of base or support 8 from its normal or level position. For example, when support 8 wanders from normal horizontal position about axis of freedom 111, the contact arm of pick-off 124 moves from its open-circuit position to contact-closing position whereby motor 123 is energized in the proper direction to cause gyro 116 to precess and carry support 8 with it about axis 111, back to the normal position. Of course, any other well-known type of pick-offs may be substituted for the one conventionally shown. Torque motor 122 is energized in a similar manner from either of the gyroverticals 1 or 12 by means not shown. For example a pick-off similar to 124 may be applied to gyrovertical 12 between rotor casing 13 and the gimbal ring 17 to be responsive to any wander from the normal or horizontal position, of support 8 about axis 110. As such pickoff and follow-up controls are well known, they have not been shown in detail.

*Operation*

The operation will be clear from the foregoing description and is briefly résuméd as follows. Before launching, the gyro rotors are brought up to speed, the gyroscopes and gimbals are centralized in the position shown upon FIGURES 1 and 3 by suitable caging means, not shown, or otherwise, and released at launching. At take off, the acceleration will be largely or entirely in the fore-and-aft direction. This acceleration will cause the gyroverticals 1 and 12 to precess in opposite directions about axes 7 and 7' whereby sliders 27 and 27a are pivoted equally in opposite directions. The voltage increase is proportional to the acceleration and is applied by leads 31 to amplifier 32 where a linearly amplified version of the input voltage, proportional to acceleration, is applied over line 33 and distributor 34, to torque motors 23 and 25. The connections are such that the applied torques very nearly annul the precession-inducing acceleration forces, so that the angles of precession are kept very small, albeit a true measure of accelerations.

The amplified voltage is also integrated at 38 to give an output voltage proportional to velocity in the direction of flight. This voltage is applied over lead 49 to distributor 50, and, modified as previously explained, over lead 45 to second integrator 46 where the applied voltage is again integrated and divided by the radial distance to earth's center, to give an output proportional to the angle α which appears as a rotation of shaft 53. Any lateral acceleration will be of minor value and will result in a very small precession of gyroverticals 1 and 12 in opposite directions about their common transverse axis. This results in closing of a control circuit by means of pick-off 125, FIGURE 1, which acts directly upon the missile steering controls, not shown, to restore the missile to the pre-selected great circle trajectory. The precession about axis 11 will be so small as to have practically no effect upon sliders 27 and 27a.

Rotation of shaft 53 through the angle α, in the manner already described, results in the application of voltages over lines 72 and 77 to distributors 50 and 34 in accordance with the respective components of the earth's centrifugal force, over line 83 to distributor 50 in accordance with the Coriolis force, and over lines 86 and 81 is distributors 34 and 50, respectively, in accordance with the components of earth rotation. In the manner previously described, the several voltages are combined in the magnetic amplifiers and any resultant D.C. voltage applied to the respective torque motor 22, 23, 24, and 25 to induce precessions annulling the tilts of the gyroverticals otherwise caused by the rotation of the earth and travel of the missile in an arcuate path over and about the earth's surface. At the same time, the base 8 supporting the gyroverticals is maintained by gyros 113, 116 and 119 directionally and horizontally stabilized.

The gyroverticals are therefore responsive only to acceleration forces induced by the missile's propelling mechanism, and the first and second integrated voltages are a true and accurate measure of speed and distance traversed and are available for accurate dead-reckoning computations of the actual instantaneous position of the missile and comparison, during flight, of that position with the desired precomputed trajectory with great accuracy and guided in to the target.

While I have shown a preferred form of the invention as now known to me, various alterations, modifications, and substitutions of equivalents will be apparent to those skilled in the art after a study of the foregoing disclosure.

Hence I desire not to be limited to the precise details of construction shown. On the contrary the disclosure is to be taken in an illustrative rather than a limiting sense; and it is my desire and intention to reserve all modifications falling within the scope of the subjoined claims.

In the claims, the term "self-contained" as applied to the missile, means a missile in which all control signals during flight originate within the missile itself. The "inner gimbal axis" of the gyroverticals is the axis about which the rotor casings are directly pivoted. The term "relative angle of precession" as used in the claims, means the algebraic difference of the angles of precession of gyroverticals 1 and 12 about their respective gimbal axes 7 and 7' at any given instant.

What I claim is:

1. In a control for a guided missile, a universally mounted stabilized support, a pair of pendulous gyroverticals universally mounted upon said support and precessing in response to horizontal acceleration of said support, means responsive to relative precessional movement of said gyroverticals to develop an electrical signal proportional to said acceleration, amplifier means responsive to said signal and integrating the same with respect to time to produce first and second signals proportional respectively to linear speed and angular distance from a predetermined fixed point, computer means responsive to said signals and producing output torque signals responsive to positional errors otherwise affecting said gyroverticals, and means applying said output signals to said gyroverticals to induce correctional precession thereof.

2. In a control mechanism for a guided missile, a universally mounted support, first and second pendulous gyroverticals universally mounted on said support for spinning in opposite directions, means responsive to relative angular precession of said gyroverticals due to acceleration of the missile in the direction of flight, to establish a potential proportional to such precession, means doubly integrating said potential to produce an output signal proportional to the instantaneous angle of travel about the earth's center, computer means actuated by and in accordance with said output signal to produce a resultant corrective signal, torque motor means energizable to apply corrective torques to said gyroverticals opposing said precession and circuit means for applying said corrective signal to said torque motor means to reduce precession of said gyroverticals.

3. The control mechanism of claim 2 wherein said corrective signal includes a correction for the centrifugal force of the earth.

4. The control mechanism of claim 2 wherein said corrective signal includes a correction for the earth's rotation.

5. The control mechanism of claim 2 wherein said corrective signal includes a correction for the Coriolis force due to travel of the missile about earth's center.

6. A control mechanism for a self-contained guided missile comprising, a universally-mounted support, first and second pendulous gyroverticals independently gimbaled on said support for pivotal movement about mutually normal horizontal axes, means directionally stabilizing said support with one said signal axis of each said gyrovertical in the direction of flight of the missile, a potentiometer winding carried by said support, a pair of sliders movable over and in contact with said winding, and means operating each said slider by and in response to precession of a respective gyrovertical about said one gimbal axis to produce a signal proportional to the relative angle of precession, the rotors of said gyroverticals operating in respectively opposite directions.

7. A control mechanism for guided missiles comprising, a support, gimbal means mounting said support for universal pivotal movement about three mutually normal concurrent axes, one said axis being horizontal in the direction of flight of the missile and another said axis being normally vertical, first and second pendulous gyroverticals, gimbal means independently mounting said gyroverticals on said support with their outer gimbal axes aligned transversely of the missile and their inner gimbal axes normally horizontal in the flight path, and means responsive to the relative angle of precession of said gyroverticals about said inner axes to establish a signal proportional to acceleration along said flight path.

8. In a guidance system for a guided missile, a support, gimbal means mounting said support for universal pivotal movement about first, second and third mutually normal concurrent axes, said axes being normally (1) vertical, (2) horizontal in the flight path and (3) horizontally transverse of the flight path, respectively, gyroscopic means carried by said support and stabilizing the same, directionally about said first axis and horizontally about said second and third axes, first and second pendulous gyroverticals, gimbal means universally mounting said gyroverticals on said support for pivotal movement about first axes in the flight path and second axes horizontally transverse of the flight path, the rotors of said gyroverticals spinning in opposite directions, and means operated by and in response to relative precession of said gyroverticals about their said first axes to establish a signal proportional to acceleration along the flight path.

9. A guidance system as recited in claim 8, said last named means comprising a potentiometer winding carried by said support, first and second sliders independently movable along and in contact with said winding, and operating connections moving each slider by and in accordance with precession of a respective gyrovertical about its said first axis, to establish a voltage proportional to said precession.

10. A guidance system as recited in claim 9, first and second torque motors each connected to apply a torque, when energized, about said second axes of the gyroverticals, respectively, means amplifying said voltage, and connections applying the amplified voltage to said torque motors to substantially annul the precession of said gyroverticals.

11. In a guidance system for a guided missile, a universally mounted support, a pair of pendulous gyroverticals, means mounting said gyroverticals in said support for freedom about axes transverse to and parallel with the flight path, power means energizable to apply precessing torques to said gyroverticals about said transverse axis, control means operated by and in response to relative precession of said gyroverticals about said parallel axes to energize said power means to substantially counteract the precession of missile acceleration, and means operated by said control means to modify energization of said power means in accordance with the earth's rotation, earth's centrifugal force and the Coriolis force due to angular movement of the missile about the earth's center, whereby said gyroverticals are maintained with their spin axes substantially directed to earth's center during flight.

12. In a guidance mechanism for a long-range guided missile, a support, gimbal means mounting said support for universal pivotal movement about first, second and third concurrent axes which are respectively, normally vertical, horizontal in the direction of flight, and horizontally transverse of said flight direction, gyroscopes carried by said support for stabilizing the same in and about said axes, first and second pendulous gyroverticals, gimbals mounting said gyroverticals on said support for independent pivotal movement about axes normally horizontal in the flight direction and transverse thereto, respectively, a potentiometer winding carried by said support, a pair of sliders independently movable over said potentiometer, operating means moving each slider by and in response to precession of a respective gyrovertical about the flight axis, a pair of torque motors each energizable to apply a torque to a respective gyrovertical about its said transverse axis, and means including said potentiometer to energize said torque motors by a voltage comprising a composite function of the angle of relative precession of said gyroverticals and the first and second time integrals thereof.

13. A guidance mechanism as in claim 12, and means modifying said voltage in accordance with the centrifugal force of the earth, the rotation of the earth and the Coriolis force due to missile speed over and about the earth's surface.

14. A guidance and control system for guiding a missile in and along a great circle trajectory from launching site to target, comprising, a first crankshaft having first and second cranks at 90° relation, a second crankshaft, gear means connecting said first and second shafts in 1:2 speed ratio, first, second and third slide bars, sine bar means connecting each slide bar to a respective crank for axial translation thereby, a potentiometer winding associated with each slide bar, respectively, a slider carried by each slide bar for movement along and in contact with a respective winding, and means connected to continuously rotate said first crankshaft through an angle equal to the angle subtended by two radii to the earth's center, one from the instantaneous position of the missile and another from the intersection of the equator with the plane of said great circle trajectory.

15. In a guidance and control system for guiding a long-range missile in and along a great circle trajectory between a launching site and target, a first crankshaft having first and second cranks at 90° relation, a second crankshaft, means connecting said crankshaft, for rotation in 1:2 ratio, first, second and third slide bars mounted for axial translation only, sine bar means connecting each slide bar to a respective crank for operation thereby, potentiometers, each connected with a respective slide bar for adjustment thereby, a pair of gyroverticals mounted for precession in response to missile acceleration along the flight path, means responsive to and controlled by said precession to rotate said crankshafts, torque applying means connected with said gyroscope to apply correctional torques thereto, and circuit connections from said potentiometers to said torque applying means.

16. In a long range guidance system for guiding a self-contained missile along a predetermined trajectory, first and second pendulous gyroverticals spinning in opposite directions, means mounting each said gyrovertical for pivotal movement about mutually normal horizontal inner and outer axes, with said inner axes parallel, means maintaining said inner axes in the vertical plane containing the trajectory, means responsive to the relative angle of precession of said gyroverticals about said inner axes to produce a signal proportional to component acceleration of said missile in the direction parallel to said inner axes, and means applying an amplified version of said signal to the outer axes of said gyroverticals to proportionately reduce said angle of precession.

References Cited by the Examiner
UNITED STATES PATENTS

| | | | |
|---|---|---|---|
| 1,947,562 | 2/34 | Marmonier | 74—78 |
| 2,109,283 | 2/38 | Boykow | 73—151 |
| 2,183,314 | 12/39 | Goddard | 244—79 |
| 2,542,564 | 2/51 | Park | 235—61 |
| 2,608,867 | 9/52 | Kellogg | 74—5.34 |
| 2,613,071 | 10/52 | Hansel | 73—490 |
| 2,620,669 | 12/52 | Braddon | 74—5.4 |

SAMUEL FEINBERG, *Primary Examiner.*

CHESTER L. JUSTUS, NORMAN H. EVANS, SAMUEL BOYD, *Examiners.*